United States Patent
Bendersky

(10) Patent No.: US 10,970,378 B2
(45) Date of Patent: Apr. 6, 2021

(54) SECURE GENERATION AND VERIFICATION OF MACHINE-READABLE VISUAL CODES

(71) Applicant: CyberArk Software Ltd., Petach-Tikva (IL)

(72) Inventor: Arthur Bendersky, Tel Aviv (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/410,182

(22) Filed: May 13, 2019

(65) Prior Publication Data

US 2020/0364323 A1    Nov. 19, 2020

(51) Int. Cl.
| | | |
|---|---|---|
| G06F 21/36 | (2013.01) | |
| G06F 21/62 | (2013.01) | |
| G06F 21/33 | (2013.01) | |
| G06K 19/06 | (2006.01) | |
| G06F 21/74 | (2013.01) | |
| H04L 9/32  | (2006.01) | |

(52) U.S. Cl.
CPC .............. *G06F 21/36* (2013.01); *G06F 21/33* (2013.01); *G06F 21/6209* (2013.01); *G06F 21/74* (2013.01); *G06K 19/06037* (2013.01); *H04L 9/3263* (2013.01)

(58) Field of Classification Search
CPC .......... G06F 21/36; G06F 21/74; G06F 21/33; G06F 21/6209; G06K 19/06037; H04L 9/3263
See application file for complete search history.

(56) References Cited

U.S. PATENT DOCUMENTS

| | | | |
|---|---|---|---|
| 6,588,664 B2 * | 7/2003 | Davies ................. | G06Q 20/342 235/381 |
| 7,539,864 B2 * | 5/2009 | Labaton .............. | H04L 63/0442 713/168 |

(Continued)

FOREIGN PATENT DOCUMENTS

CN    105718792 A * 6/2016 ............. G06F 21/23

OTHER PUBLICATIONS

INFOSEC, "Security Attacks via Malicious QR Codes," retrieved from https://iresources.infosecinstitute.com/security-attacks-via-malicious-qr-codes/#gref on May 13, 2019 (12 pages).

(Continued)

*Primary Examiner* — Oleg Korsak
*Assistant Examiner* — Feliciano S Mejia
(74) *Attorney, Agent, or Firm* — Finnegan, Henderson, Farabow, Garrett & Dunner, LLP

(57) ABSTRACT

Disclosed embodiments relate to systems and methods for securely generating verifiable machine-readable visual codes. Techniques include identifying a data element to be made available to a computing device, generating a machine-readable visual code including the data element, making available the generated machine-readable visual code to a display medium, such that the generated machine-readable visual code can be decoded from the display medium to yield the data element and can be validated. The computing device's ability to interact with the data element may be conditioned on the validation of the data element being successful.

19 Claims, 7 Drawing Sheets

(56) References Cited

U.S. PATENT DOCUMENTS

| | | | | |
|---|---|---|---|---|
| 8,103,761 | B2* | 1/2012 | Adelman | H04L 61/302 709/224 |
| 8,490,871 | B1* | 7/2013 | Miller | G06Q 20/3276 235/380 |
| 8,509,493 | B2* | 8/2013 | Oka | G06F 21/445 382/115 |
| 8,627,438 | B1* | 1/2014 | Bhimanaik | H04L 65/60 726/9 |
| 8,701,166 | B2* | 4/2014 | Courtney | G06F 21/36 726/5 |
| 9,311,652 | B2* | 4/2016 | Farn | G06K 19/0614 |
| 9,380,037 | B2* | 6/2016 | Parann-Nissany | H04L 63/06 |
| 9,401,895 | B2* | 7/2016 | Herberg | H04L 63/0428 |
| 9,430,646 | B1* | 8/2016 | Mushtaq | H04L 63/1425 |
| 9,836,946 | B2* | 12/2017 | Zosimadis | G07F 13/02 |
| 9,858,350 | B2* | 1/2018 | Malkin | G06F 16/9554 |
| 9,858,518 | B2* | 1/2018 | Nishizaki | G06K 7/1417 |
| 9,953,475 | B2* | 4/2018 | Smith | G06K 19/06037 |
| 10,134,209 | B2* | 11/2018 | Favier | E05B 73/0047 |
| 10,230,705 | B1* | 3/2019 | Joshi | H04L 63/107 |
| 10,374,789 | B2* | 8/2019 | Cao | H04L 9/00 |
| 2009/0026270 | A1* | 1/2009 | Connell, II | A47F 9/046 235/462.41 |
| 2014/0173695 | A1* | 6/2014 | Valdivia | G06F 21/33 726/4 |
| 2015/0089642 | A1* | 3/2015 | Di Cocco | H04L 63/1483 726/22 |
| 2016/0267433 | A1* | 9/2016 | Liu | G06Q 10/10 |
| 2016/0323108 | A1* | 11/2016 | Bhogal | H04L 63/123 |
| 2017/0046671 | A1* | 2/2017 | Shauh | G06Q 30/0601 |
| 2018/0082050 | A1* | 3/2018 | Flink | G06F 21/32 |
| 2018/0276674 | A1* | 9/2018 | Ramatchandirane | H04W 12/0609 |
| 2018/0315027 | A1* | 11/2018 | Kumar | H04L 63/062 |
| 2019/0244198 | A1* | 8/2019 | Waters | H04L 9/0869 |
| 2019/0253254 | A1* | 8/2019 | Brownlee | H04L 9/0618 |
| 2020/0065515 | A1* | 2/2020 | Wu | G06F 21/604 |

OTHER PUBLICATIONS

Welivesecurity, "Be wary when scanning QR codes with IOS 11's camera app," retrieved from https://www.welivesecurity.com/2018/03/128/scanning-qr-codes-ios-11si on May 13. 2019 (5 pages).

Gosafeonline, "QR Code—Falling Prey to Malicious Websites," retrieved from https://iwww.csa.gov.sg/gosafeonline/go-safe-for-nie/homeinternetusers/qr-code-falling-prey-to-malicious-website on May 13, 2019 (2 pages).

easy-hide-ip.com, "How to Protect Yourself from Malicious QR Codes," retrieved from https://easy-hide-ip.com/blog/how-to-protect-yourself-from-malicious-gr-codes on May 13, 2019 (4 pages).

Bullguard, "Stay away from malicious or codes—BullGuard," retrieved from https://www.bullguard.com/bullguard-security-center/mobile-security/mobile-threats/malicious-qr-codes.aspx on May 13, 2019 (3 pages).

\* cited by examiner

SECURE GENERATION AND VERIFICATION OF MACHINE-READABLE VISUAL CODES

BACKGROUND

An increasingly popular way to share electronic information, such as website uniform resource locators (URLs) and textual information, is a quick response (OR) code. For example, advertisers have begun to include QR codes on product packaging, websites, billboards, magazines, and other display media, which individuals can scan with their smartphone or tablet devices. By scanning and decoding the OR code, the contents encoded into the OR code become available to the individual. The individual can then navigate to a web page or advertisement supported by the advertiser. Other uses of OR codes (and other types of encoded symbols) include conveying information, electronic communications, social media messaging, and more.

By their nature, however, visual codes such as OR codes may not be easy (or possible) for users to decipher. While a scanning and decoding application on a smartphone or tablet may be able to decode the information contained in a QR code, for example, a human generally cannot. This gives rise to security vulnerabilities. When a user receives a OR code or other visual code, they may be unable to verify the legitimacy of the code or its contents. The user may not be able to tell whether the code is coming from a legitimate source and has legitimate characteristics, or whether the source or other characteristics are suspicious (e.g., unknown, from an unknown website, associated with a foreign country, in a foreign language, etc.). This is in contrast to a user receiving textual information, such as a website URL, which the user is more readily able to understand and verify. In the case of OR codes and other visually encoded codes, users are often vulnerable to attacks where the code contains malicious or otherwise insecure content. Without actually scanning the code and decoding its contents, the user cannot understand the contents. In the case of security threats, by that point the attack may already be accomplished (or initialized and difficult to stop).

The malicious and insecure use of OR codes and other visual codes is increasingly problematic for users, organizations, and enterprises. For example, such visual codes can be used to perform phishing attacks, where users are lured into decoding the code and thereby communicating with or sharing information with an untrusted entity. Further, in some instances visual codes may encode malicious application code, or link to malicious application code, which can then be downloaded onto the user's device. Other problems arising from visual codes include users being transported unknowingly, based on decoding of the codes, to dangerous or inappropriate websites or applications.

Accordingly, in view of these and other deficiencies in existing techniques, technological solutions are needed for securely transmitting data, application code, URLs, network addresses, contact information, secrets, credentials, and other information through machine-readable visual codes. In contrast to current, insecure uses of visual (e.g., OR) codes, the techniques discussed below enable verification or authentication of visual codes before a user's device acts on decoded content from within a code (e.g., follows a URL, downloads content, executes code, etc.). The disclosed techniques thus improve upon current, insecure approaches, because the disclosed techniques protect against unauthorized activity and malicious attacks that are based on content encoded into visual codes.

SUMMARY

The disclosed embodiments describe non-transitory computer readable media, systems, and methods for securely generating verifiable machine-readable visual codes. For example, in an exemplary embodiment, there may be a non-transitory computer readable medium including instructions that, when executed by at least one processor, cause the at least one processor to perform operations for securely generating verifiable machine-readable visual codes. The operations may comprise identifying a data element to be made available to a computing device capable of receiving and decoding machine-readable visual codes; generating a machine-readable visual code including the data element, wherein the generating includes at least one of: signing the data element with a certificate, encrypting the data element with a cryptographic key, or inserting a token along with the data element into the generated machine-readable visual code; and making available the generated machine-readable visual code to a display medium, such that the generated machine-readable visual code can be decoded from the display medium to yield the data element and validated by at least one of: confirming the validity of the certificate, decrypting the data element with a decryption key corresponding to the cryptographic key, or confirming the validity of the token; wherein the computing device's ability to interact with the data element is conditioned on the validation of the data element being successful.

According to a disclosed embodiment, the computing device is configured to decode the generated machine-readable visual code in a read-only manner.

According to a disclosed embodiment, an intermediary device, separate from the computing device, is configured to decode the generated machine-readable visual code in a sandboxed environment.

According to a disclosed embodiment, the generated machine-readable visual code is at least one of: a one-dimensional bar code, a two-dimensional bar code, or a visual pattern.

According to a disclosed embodiment, the computing device is configured to optically scan and decode the machine-readable visual code.

According to a disclosed embodiment, the certificate has a corresponding certificate authority source, and the computing device is configured to compare the certificate authority source against a list of trusted certificate authority sources.

According to a disclosed embodiment, the cryptographic key is a private key.

According to a disclosed embodiment, the operations further comprise making available a public key, corresponding to the private key, to the computing device.

According to a disclosed embodiment, the computing device is configured to utilize the public key to decrypt the data element.

According to a disclosed embodiment, the computing device is configured to compare the decrypted data element with a hash value.

According to another disclosed embodiment, a method may be implemented for securely generating verifiable machine-readable visual codes. The method may comprise identifying a data element to be made available to a computing device capable of receiving and decoding machine-readable visual codes; generating a machine-readable visual code including the data element, wherein the generating includes at least one of: signing the data element with a certificate, encrypting the data element with a cryptographic key, or inserting a token along with the data element into the generated machine-readable visual code; and making available the generated machine-readable visual code to a display medium, such that the generated machine-readable visual code can be decoded from the display medium to yield the data element and validated by at least one of: confirming the validity of the certificate, decrypting the data element with a decryption key corresponding to the cryptographic key, or confirming the validity of the token; wherein the computing device's ability to interact with the data element is conditioned on the validation of the data element being successful.

According to a disclosed embodiment, the method further comprises transmitting the generated machine-readable visual code to the display medium.

According to a disclosed embodiment, the method further comprising transmitting the decryption key to the computing device.

According to a disclosed embodiment, the method further comprising transmitting the token to the computing device.

According to a disclosed embodiment, the token is unique and randomly generated.

According to a disclosed embodiment, the token has an expiration time attribute or time-to-live attribute.

According to a disclosed embodiment, the cryptographic key is a symmetric key and the decryption key is also the symmetric key.

According to a disclosed embodiment, the method further comprising receiving a report that the data element was successfully validated.

According to a disclosed embodiment, the method further comprising receiving a report that the data element was not successfully validated.

According to a disclosed embodiment, the method further comprising receiving a report that the computing device accessed a network resource corresponding to the data element.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of securely transmitting data (e.g., network addresses, URLs, software code, scripts, uniform resource identifiers (URIs), contact information, sensitive data, secrets, credentials, and other data) described herein overcome several technological problems relating to security, usability, and efficiency of visual code-based communications. In contrast to existing approaches, which involve a user decoding and interacting with the contents of a visual code before the legitimacy of the contents can be determined, the disclosed techniques enable verification of visual codes and their contents before the user or their device interacts with the contents of the codes. By verifying the code and its contents without requiring interaction with the contents, vulnerabilities such as phishing, information theft, malicious code injection, and undesirable network navigation are avoided. Based on the verification of a visual code or its contents, vulnerable or insecure contents may be blocked, deleted, quarantined, added to black lists, or used to trigger alerts, among other precautionary actions. As a result, users and organizations are more securely and efficiently able to share data via visual codes.

Reference will now be made in detail to the disclosed embodiments, examples of which are illustrated in the accompanying drawings.

Figure 1:
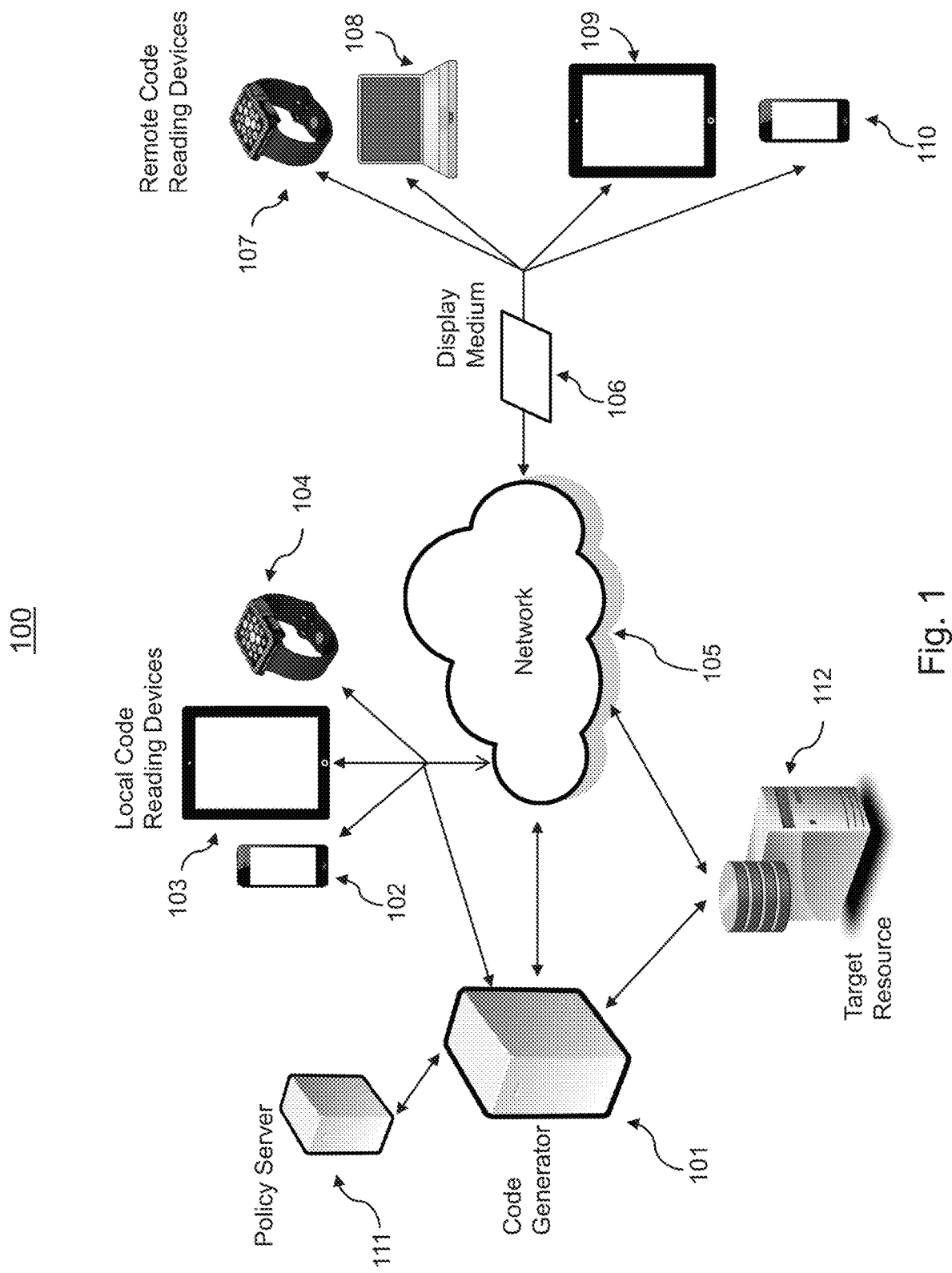
FIG. 1 is a block diagram of an exemplary system for securely generating verifiable machine-readable visual codes in accordance with disclosed embodiments.

FIG. 1 illustrates an exemplary system 100 for securely generating and sharing verifiable machine-readable visual codes. System 100 may include a code generator 101 which is configured to generate machine-readable visual codes. In various embodiments, code generator 101 may be configured to generate one or more different types of visual symbols that encode data. Examples include one-dimensional bar codes (e.g., UPC codes, EAN codes, Code 128 codes, Codabar codes, proprietary one-dimensional codes, etc.), two-dimensional bar codes (e.g., QR codes, Datamatrix codes, Aztec codes, PDF417 codes, proprietary two-dimensional codes, etc.), three-dimensional bar codes (e.g., displayed in two-dimensions but having the appearance of three dimensions), encoded images or graphics, encoded visual or geometric patterns, encoded color schemes, and more. In accordance with these types of visual symbols, various types of data may be encoded. For example, a Code 128 bar code or QR code may encode plain text, a website URL, a network URI, a secret or credential, application code, personal data, or more. When a scanning device, as discussed below, scans one of these types of visual codes, the encoded data and any other encoded contents may be revealed for processing. Further examples of encodable content and encoding schemes are discussed below in connection with FIG. 2.

In some embodiments, code generator 101 may communicate with a policy server 111. For example, policy server 111 may be configured to determine whether a particular code generated by code generator 101 should be enhanced with security, and if so, what type of security to apply. In some situations, for example, policy server 101 may determine that data to be encoded in a visual code is not sensitive (e.g., time information, weather information, observational data, etc.) and does not need security enhancement. In other situations, when the encoded data is sensitive or prone to security issues (e.g., a network address, URL, URI, secret, credential, etc.), policy server may determine that the visual code should be secured, such as through the techniques discussed below in connection with FIGS. 3-6. In other embodiments, policy sever 111 is configured to add security (e.g., as discussed in connection with FIGS. 3-6) by default to each code generated by code generator 101. Additionally, as discussed further below, policy server 111 may be configured to perform preventative and remedial actions when visual codes are unsuccessfully decoded or verified. For example, when a computing device 102-104 or 107-110 is unable to decode or verify a particular visual code, policy server 111 may receive a report of the unsuccessful decoding or verifying and block the particular encoded contents, add it to a black list, generate an alert, etc.

Code generator 101 and policy server 111 may be part of the same computing system or device, or may be separate. For example, in some embodiments code generator 101 may be implemented by an advertiser that generates visual codes containing advertisement data. In that situation, policy server 111 may also be operated by the advertiser (e.g., integrated into code generator 101, or separate), or may be operated by a third-party security provider. As another example, code generator 101 may be operated by an enterprise that inserts visual codes with encoded information into web pages or application interfaces, which are then accessible to computing devices 102-104 or 107-110 to decode. Similarly, policy server 111 may be integrated into the same machine or system as code generator 101 (e.g., part of the same web server, application server, etc.) or separate. As a further example, code generator 101 may be part of an IoT device (e.g., network-connected vehicle), which generates visual codes that are accessible to drivers of the vehicle and used for secured access or use of the vehicle. In that situation, policy server 111 may be internal to the vehicle, or may be an external network-accessible server.

System 100 also includes one or more computing devices, which may be local devices 102-104 to the code generator 101 or remote devices 107-110 to the code generator 101. Different embodiments may involve different uses of local or remote computing devices. For example, if the code generator 101 is part of an IoT device (e.g., smart home appliance, network-connected vehicle, home security system, building entry controller, room entry controller, parking garage controller, etc.), the code generator 101 may be located proximate to the computing devices 102-104 that will receive and decode the encoded code. In such a situation, computing devices 102-104 may receive the encoded code without requiring use of network 105. Alternatively, in some situations, remote devices 107-110 may obtain access to an encoded code after the code has been made available to a display medium 106. For example, display medium 106 may be an electronic display (e.g., portion of a web page, intranet page, application interface, television-based display, screen-based display, light-projected display, etc.) or a non-electronic display (e.g., billboard, sign, poster, wall display, pamphlet, book, magazine, article, newspaper, etc.). In such situations, whether the display medium 106 is electronic or non-electronic, remote devices 107-110 may access (e.g., optically scan) the encoded code to decode its contents.

Computing devices 102-104 and 107-110 may be similar to each other. Such devices may include a variety of different computing devices capable of scanning (e.g., optically, audibly, acoustically, via motion sensors, via vibration sensors, etc.) encoded codes. For example, one or more of computing devices 102-104 and 107-110 may be a personal computer (e.g., a desktop or laptop), a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home devices, industrial devices, etc.), or various other devices capable of decoding encoded codes generated by code generator 101. Computing devices 102-104 and 107-110 may include scanning hardware and software capable of scanning various types of scannable codes or images, such as those generated by code generator 101.

In embodiments where the encoded code is made available to remote devices 107-110 over network 105, such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. For example, network 105 may transport a communication (e.g., one or more packets) embodying the encoded code to the display medium as part of, or for incorporation into, a web page or application interface display medium 106 (e.g., based on HTML, Java™, Flash™, CSS, etc.). In other embodiments, network 105 may transport the encoded code to a network location where the encoded code is printed (e.g., laser printed, dot matrix printed, inkjet printed, thermal printed, 3D-printed, etc.) into a physical display medium 106.

In some embodiments, as shown in system 100, an encoded code may refer to a target resource 112. For example, if the encoded code includes a network address, URL, URI, or other network identifier, the network identifier may be associated with a particular target resource 112. In such embodiments, the target resource 112 may be a particular server (e.g., web server, application server, etc.), a virtualized server or application (e.g., virtual machine, container instance, serverless code, etc.), a file (e.g., document, code, application, etc.), or other network-accessible resource. As illustrated, target resource 112 may be accessible to code generator 101 via network 105 in some embodiments. Further, in some embodiments target resource 112 is accessible via network 105 to display medium 106 and/or computing devices 107-110.

Figure 2:
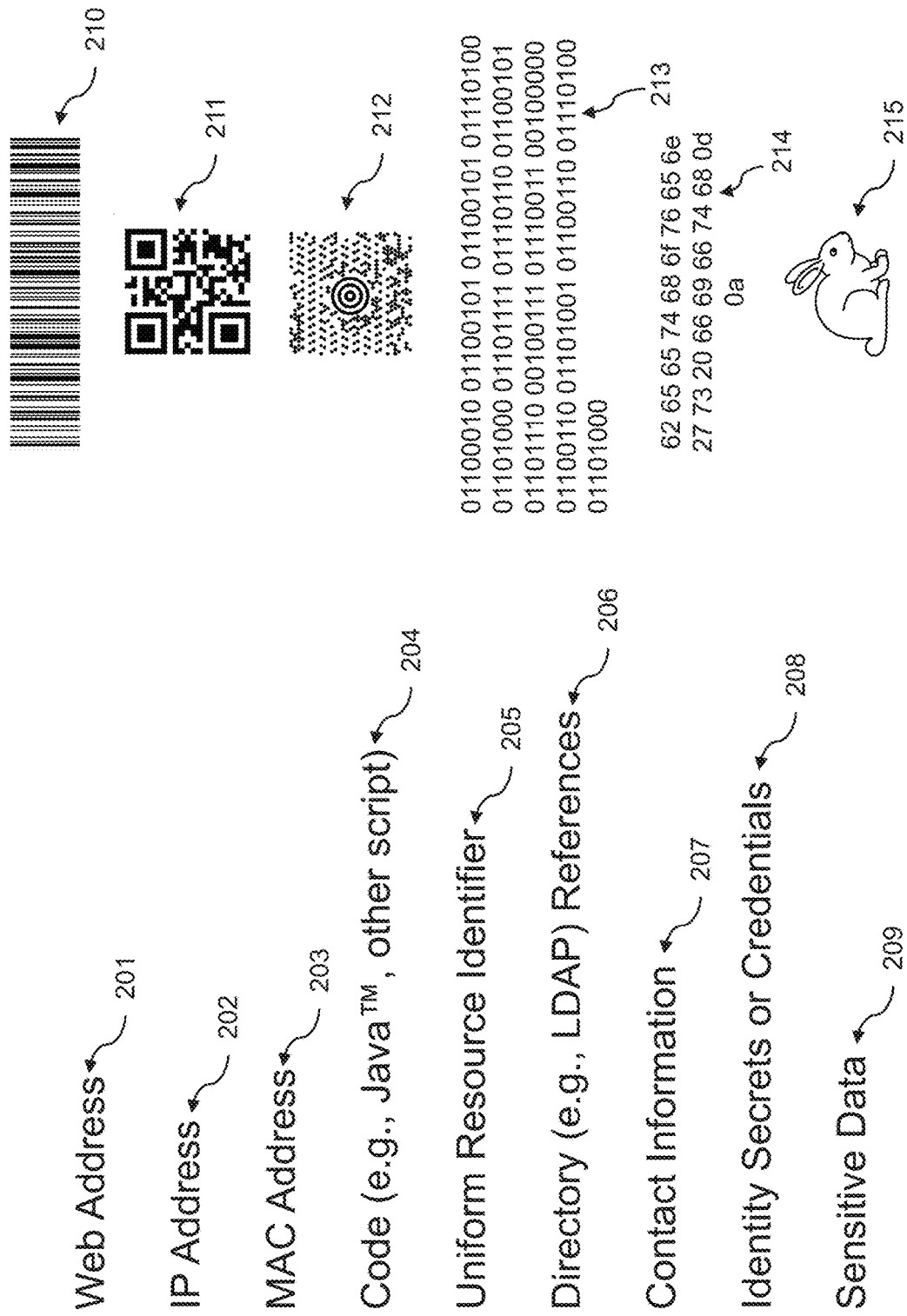
FIG. 2 is a block diagram showing exemplary encoded content and exemplary machine-readable visual codes in accordance with disclosed embodiments.

FIG. 2 is a block diagram showing exemplary encoded content 201-209 and exemplary machine-readable visual codes 210-215. Consistent with the discussion above, numerous different types of content may be encoded into a visual code, such as a web address 201, IP address 202, MAC address 203, application code 204, a URI 205, a directory (e.g., LDAP) reference 206, personal or enterprise contact information 207, identity secrets or credentials 208, sensitive (e.g., personal, corporate, financial, etc.) data 209, and more. In an advertising context, for example, an advertiser may wish to include a web address or IP address in a QR code 211, which users can decode and thereby access the web site. In a building entry context, for example, an encoded image 215 may encode an access code or token used for a user to gain access to a building. In a file sharing context, for example, a bar code 210 may be used to point to a particular URI or LDAP database where shared content can be located and downloaded. Of course, other combinations of content and encoded formats may be used too.

As shown in FIG. 2, encoded formats may take several forms, such as one-dimensional bar codes 210 (e.g., UPC codes, EAN codes, Code 128 codes, Codabar codes, proprietary one-dimensional codes, etc.), QR codes 211. MaxiCode codes 212, binary data 213, hexadecimal data 214, encoded images 215, or various other types of encoded forms (e.g., geometrical shapes or patterns, color patterns or types, etc.). Consistent with the discussion above regarding FIG. 1, code generator 101 may be configured to create one or more different types of these encoded symbols 210-215, which may contain one or more types of encoded data 201-209. According to the discussion above, in some embodiments the particular type of encoding may be selected by policy server 111. Further, as discussed below, the type of security to add to the encoded code may also be selected by the policy server 111.

Figure 3:
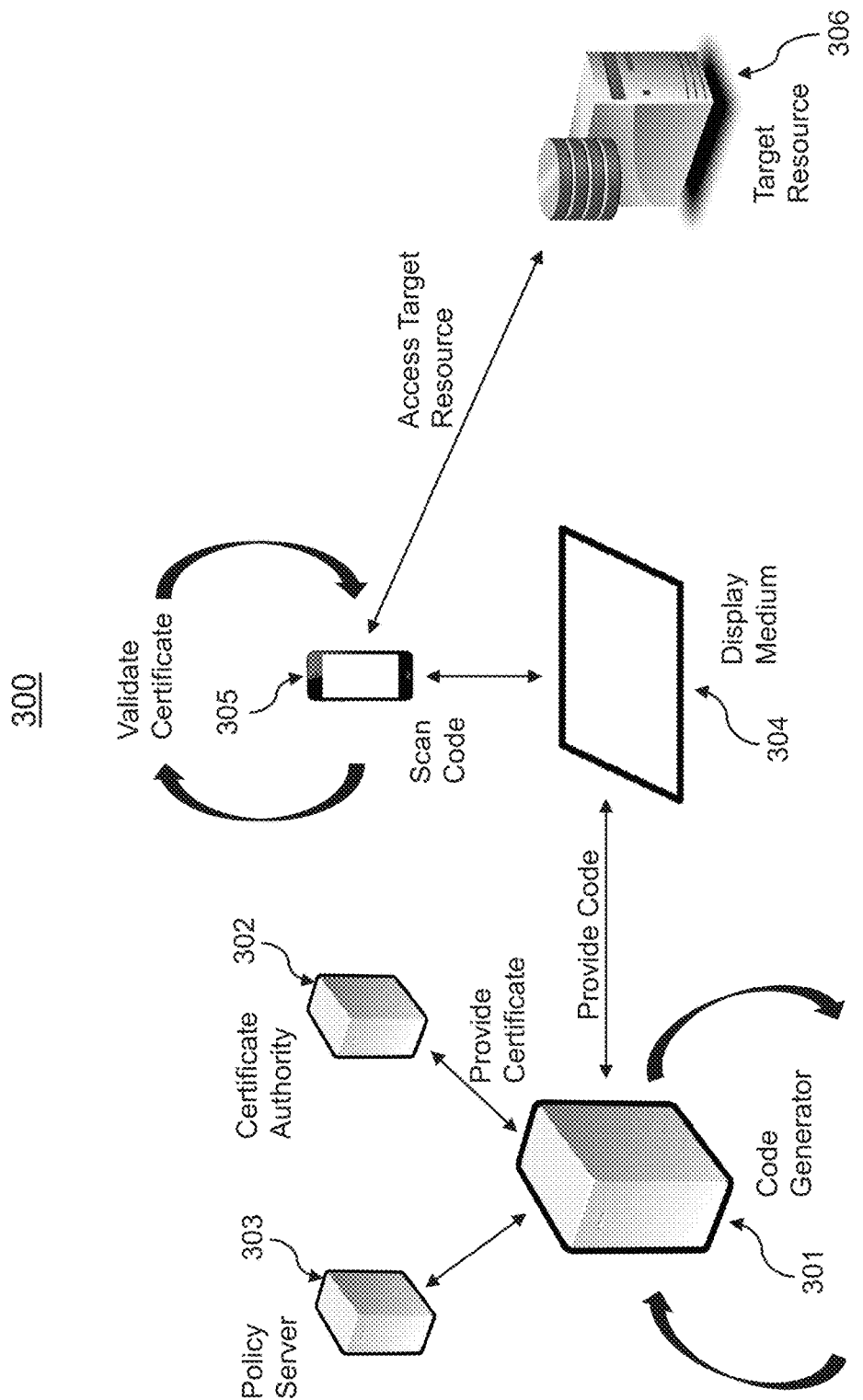
FIG. 3 is a block diagram of an exemplary system for signing data associated with machine-readable visual codes in accordance with disclosed embodiments.

FIG. 3 illustrates a block diagram of an exemplary system 300 for signing data associated with machine-readable visual codes. System 300 may include components similar to those discussed above in connection with FIG. 1. For example, code generator 301 may correspond to code generator 101, policy server 303 may correspond to policy server 111, display medium 304 may correspond to display medium 106, computing device 305 may correspond to computing devices 102-104 or 107-110, and target resource 306 may correspond to target resource 112.

In operation, system 300 may involve code generator 301 identifying content to be encoded and made available to one or more computing devices 305. Consistent with the discussion above, the code may be provided directly to computing device 305 for receiving and decoding, or may be provided to display medium 304 (e.g., a web page, application interface, screen, television, poster, billboard, newspaper, etc.) for decoding by the computing device 305. The encoded content, in some instances, may refer or link to a particular target resource 306, such as a web page, URL, URI, advertisement, file, code, or other types of content. Thus, once the computing device 305 decodes the encoded content, it may access the target resource 306. Of course, in other embodiments the encoded content does not refer to target resource 306, but instead is self-contained (e.g., the encoded content itself is an advertisement, file, code, data, etc.).

Code generator 301 may access content to be encoded in various ways. For example, if code generator 301 is part of a website system, it may access the content from another component within the website system (e.g., a sever, database, input interface, etc.) or from an external source (e.g., a third-party online advertiser, etc.), As another example, if code generator 301 is part of a secure-access system providing access to a vehicle, building, room, or other entity, it may receive an access token or other access-related data from an integrated security application, from policy server 303, or from an external resource (e.g., a third-party security service). Further, if code generator 301 is part of an online advertising system, it may obtain the content to encode (e.g., a textual, image-based, or video-based advertisement, or a link to such an advertisement) from an advertiser, an advertisement bidding system, a content distribution cache, or other sources.

Once code generator 301 has accessed content to be encoded, it may add security enhancement to the content. For example, policy server 303 may specify what type of security enhancement to apply (e.g., based on the techniques described in connection with FIGS. 3-7), how to encode the content, and other parameters. In embodiments consistent with FIG. 3, code generator 301 may sign the data with a digital certificate. For example, in some embodiments code generator 301 is configured to receive digital certificates from certificate authority 302, which it may either access upon demand or store (e.g., cache) locally at code generator 301. Certificate authority 302 may be, for example, a public key certificate (e.g., based on X,509), a TLS/SSL certificate, or another type of certificate. The digital certificates may be administered by a provider (e.g., Symantec™, GoDaddy™, Entrust™, etc.) or may be proprietary. Once the data has been signed with the digital certificate, the signed data may be encoded into a visual code by code generator 301, Consistent with the discussion above regarding FIG. 2, code generator 301 may be configured to encode the signed data into various types of encoded formats (e.g., one-dimensional bar codes, two-dimensional bar codes, unique images, geometric patterns, etc.).

The encoded signed data may then be made available to the computing device 305 in various ways. For example, in some embodiments the computing device 305 may receive a web page (e.g., HTML document, Java™-based document, Flash™-based document, etc.) requested by a browser of the computing device 305. The encoded visual code may be included in the web page (e.g., embedded into the web page document, or referenced by a hyperlink in the web page document) and available for display on the computing device 305, Alternatively, the encoded visual code may be part of an application interface (e.g., mobile application interface, personal computer application interface, etc.) that is available for viewing on the computing device 305. In further embodiments, the encoded visual code may be transmitted to a computing device associated with display medium 304. In such embodiments, display medium 304 may be a display screen or projected image (e.g., VGA, S-VGA, LED, OLED, plasma, CRT, DLP, etc.) that includes the encoded visual code. The screen may be accessible to a user of the computing device 305. For example, the screen may be a television screen, on-wall display, on-vehicle display, in-vehicle display, on-device display, etc. In further embodiments, where display medium 304 is a physical printout including the encoded visual code (e.g., a poster, billboard, newspaper, magazine, greeting card, business card, etc.), the encoded visual code may be received by a computing device before being printed for such a display.

One the computing device 305 receives the encoded visual code, or comes within a scannable range of display medium 304, computing device 305 may scan (e.g., optically scan) or read the encoded visual code and decode its contents. Consistent with the discussion above, the decoding may be based on the same technique used to encode the content. With reference to FIG. 2, for example, if the content was encoded using a QR code, the QR code algorithm may be used by computing device 305 to decode the QR code and thus reveal the signed data.

Once the computing device 305 has accessed the signed data within the encoded visual code, computing device 305 may check whether the digital certificate used to sign the data (e.g., from certificate authority 302) is trusted. For example, computing device 305 may determine whether the signer (e.g., particular certificate authority) of the data is found in a list of trusted certificate authorities maintained on the computing device 305. In some embodiments, the list of trusted certificate authorities may be stored external to the computing device 305 but accessible to the computing device 305 (e.g., stored in a network location accessible to the computing device 305). The list of trusted certificate authorities may provide their identifying information, such as hostname, domain name, owner name, public key, serial number, signature algorithm, etc.

If computing device 305 determines that the signed data was signed with an unknown or untrusted digital certificate, computing device 305 may take measures to prevent interaction with or use of the signed data. Similarly, if the data from the encoded visual code lacks any signature, such measures may be taken. For example, computing device 305 may determine to quarantine the content from the encoded visual image (e.g., in an isolated or sandboxed memory), report the content to a security server (e.g., policy server 303 or server associated with computing device 305), generate an alert regarding the content on the computing device 305 itself or an external device, delete the content, block the content from being processed by computing device 305, block the content from being executed by computing device 305, block the content from being stored in an open or insecure memory of computing device 305, or various other control actions.

On the other hand, if computing device 305 successfully determines that the content from the encoded visual image was signed by a trusted certificate authority, computing device 305 may allow further processing of the content. For example, if the content is a network URL or IP address, computing device 305 may be permitted to follow the URL or IP address (e.g., via a browser or other application), which in some embodiments may be associated with target resource 306. As another example, if the content is an executable file, computing device 305 may be permitted to execute the executable file. Further, if the content is data, computing device 305 may be permitted to locally store the data. In some embodiments, when the computing device 305 successfully validates the signing of the content, it may additionally report that successful validation to policy server 303, code generator 301, or another resource.

Figure 4:
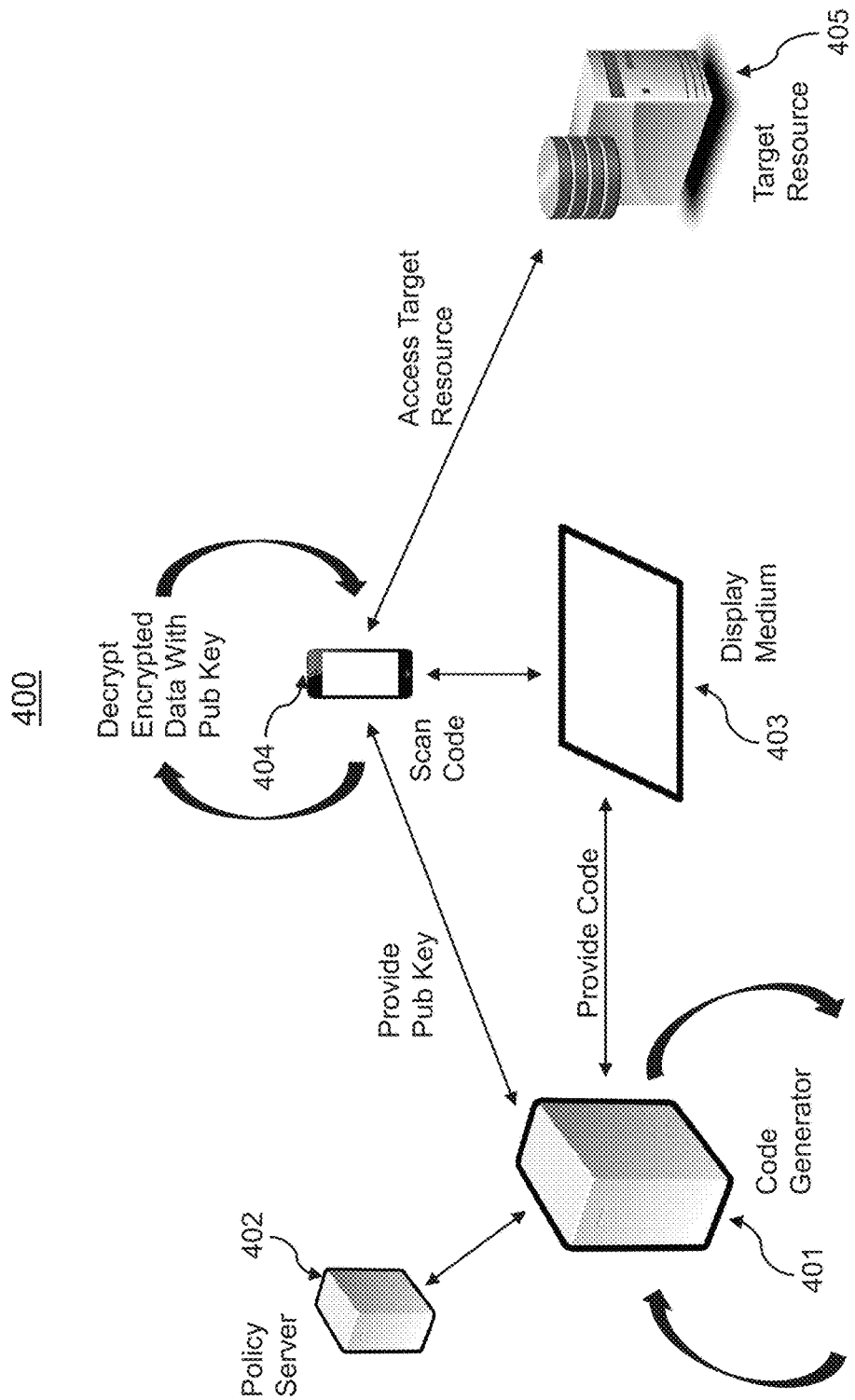
FIG. 4 is a block diagram of an exemplary system for asymmetrically encrypting data associated with machine-readable visual codes in accordance with disclosed embodiments.

FIG. 4 is a block diagram of an exemplary system 400 for asymmetrically encrypting data associated with machine-readable visual codes. System 400 may include components similar to those discussed above in connection with FIG. 1. For example, code generator 401 may correspond to code generator 101, policy server 402 may correspond to policy server 111, display medium 403 may correspond to display medium 106, computing device 404 may correspond to computing devices 102-104 or 107-110, and target resource 405 may correspond to target resource 112.

In accordance with system 400, code generator 401 may access or obtain content to be encoded in ways similar to those discussed above in connection with FIG. 3. For example, code generator 401 may directly receive or access the content from a user or another application, or may receive or access the content from a remote network resource. Once code generator 401 has accessed or obtained content to be encoded, it may encode the content into an encoded visual code consistent with the discussion above regarding FIG. 2. As discussed above, the encoding may be performed according to various different techniques. In some embodiments, the encoding technique selected may be chosen by policy server 402, as discussed above.

Code generator 401 may, prior to encoding the content, encrypt the data. In particular, FIG. 4 describes a technique for asymmetrically encrypting the data. In some embodiments, code generator 401 may encrypt the data using a private key from a private-public cryptographic key pair. For example, code generator 401 may use an asymmetric cryptography algorithm, such as RSA, Transport Layer Security (TLS), S/MIME, PGP, GPG, or various other algorithms, to encrypt the data. Code generator 401 may implement such an algorithm locally (e.g., generate the private-public cryptographic key pair itself) or may obtain the private-public cryptographic key pair from an external resource (e.g., policy server 402, a credentials vault such as a CyberArk™ vault, etc.). Once code generator 401 has generated, received, or otherwise accessed the private-public cryptographic key pair, it may encrypt the data (e.g., using the private key) and provide the public key to the computing device 404. The public key may be provided to computing device 404 in several ways (e.g., directly transmitted from code generator 401, made available from a credential vault, etc.).

In an alternative embodiment for system 400, the private-public cryptographic key pair may be generated by computing device 404 (or a credentials vault or repository accessible to computing device 404). In such an embodiment, computing device 404 may retain one of the generated keys (e.g., the private key) and transmit the other key (e.g., the public key) to code generator 401. In that situation, code generator 401 may encrypt the data using the public key it receives from computing device 404.

However code generator 401 obtains its encryption key (e.g., a private or public key from a private-public cryptographic key pair), once it has encrypted the data it may further encode the encrypted data in accordance with one of the encoding schemes discussed in connection with FIG. 2. For example, the encrypted data may be encoded into a one-dimensional or two-dimensional bar code, binary or hexadecimal data, etc. The encoded visual code may then be made available to computing device 404 as discussed above (e.g., either directly or via display medium 403). Once computing device 404 has received the encoded visual code, it may decode the code as discussed above. For example, if the encoded visual code is an encoded image or geometric pattern, as discussed in connection with FIG. 2, the encoded visual code may be decoded using the same technique by computing device 404. Computing device 404 may then attempt to decrypt the encrypted data from within the decoded code using its cryptographic key. For example, computing device 404 may have received a public key from code generator or may have generated its own private key, as discussed above. Computing device 404 can then use its cryptographic key to attempt to decrypt the contents of the decoded code.

If computing device 404 is able to successfully decrypt the contents of the decoded code using its cryptographic key (e.g., finds that the decrypted content equals a hash value associated with the content), computing device 404 may process or utilize the decrypted content. For example, as discussed above, if the content is a URL or IP address, computing device 404 may follow the URL or IP address to such a network location (e.g., target resource 405). If the decrypted content is an executable file, computing device 404 may execute the file. Further, in some embodiments computing device 404 may send a report to code generator 401 or policy server 402 confirming its successful decryption of the contents. On the other hand, if the decrypted content is unsuccessfully decrypted (e.g., the decrypted content does not equal a hash value associated with the content) or is not encrypted in the first place, computing device 404 may determine to take a control action without processing or acting on the content. For example, as discussed above, the content may be blocked, quarantined, deleted, included in a report or alert, identified in a report or alert, or otherwise addressed in a control action.

Figure 5:
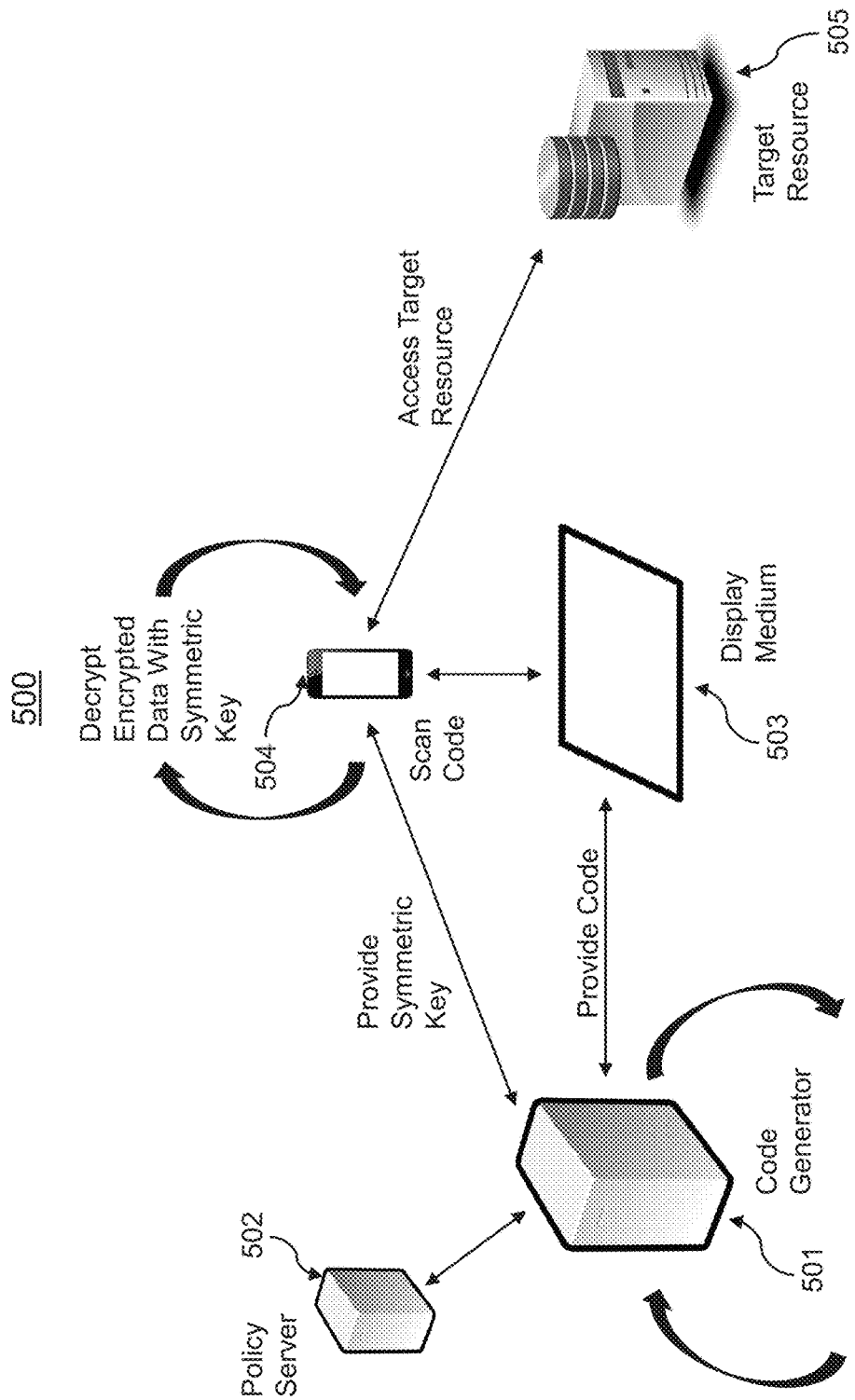
FIG. 5 is a block diagram of an exemplary system for symmetrically encrypting data associated with machine-readable visual codes in accordance with disclosed embodiments.

FIG. 5 is a block diagram of an exemplary system 500 for symmetrically encrypting data associated with machine-readable visual codes in accordance with disclosed embodiments. System 500 may include components similar to those discussed above in connection with FIG. 1. For example, code generator 501 may correspond to code generator 101, policy server 502 may correspond to policy server 111, display medium 503 may correspond to display medium 106, computing device 504 may correspond to computing devices 102-104 or 107-110, and target resource 505 may correspond to target resource 112.

Similar to system 400, system 500 may involve code generator 501 obtaining (e.g., generating or accessing) an encryption key for encrypting the data to be encoded into a visual code. Unlike in system 400, in system 500 the data may be symmetrically encrypted. For example, the data may be encrypted using a symmetric cryptographic key based on an algorithm such as Twofish, DES, Blowfish, AES, Serpent, etc. Consistent with system 400, in system 500 code generator 501 may obtain its symmetric cryptographic key based on generating the key itself, obtaining it from a separate source (e.g., credential repository or vault), or obtaining it from computing device 504. Further, computing device 504 may hold or have access to the same symmetric cryptographic key (e.g., based on having generated the key, received it from code generator 501, or from another source).

Similar to the techniques of system 400, in system 500 when computing device 504 has received the encoded visual code containing the encrypted data, computing device 504 may decode the encoded visual code, access its cryptographic decryption key (e.g., symmetric key), and decrypt the decoded content. If computing device 504 is able to successfully decrypt the decoded contents (e.g., the decrypted content equals a hash associated with the content), computing device 504 may access or interact with the decrypted content. For example, computing device 504 may follow a URL or IP address included in the content (e.g., to target resource 505), run an executable file included in the content, locally store data from the content, etc. On the other hand, if the decryption fails (e.g., the hash of the decrypted content fails to match a hash associated with the content) or there is no encryption of the decoded content, computing device 504 may take a control action to prevent interaction with the content. The control action may result in the content being, for example, blocked, quarantined, deleted, included in a report or alert, identified in a report or alert, or otherwise prevented from being interacted with by computing device 504.

Figure 6:
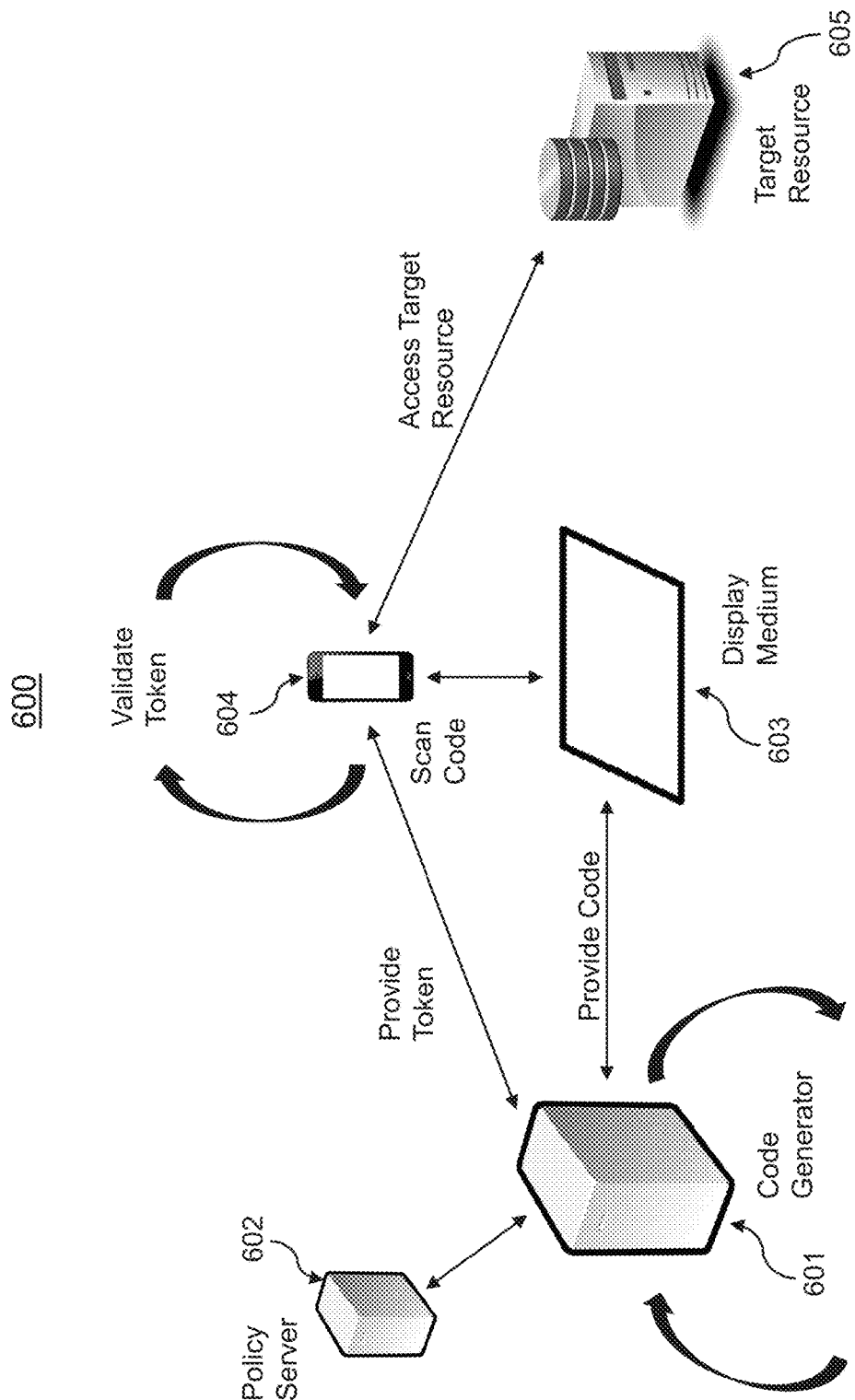
FIG. 6 is a block diagram of an exemplary system for encoding data and a token in machine-readable visual codes in accordance with disclosed embodiments.

FIG. 6 is a block diagram of an exemplary system 600 for encoding data and a token in machine-readable visual codes. System 600 may include components similar to those discussed above in connection with FIG. 1. For example, code generator 601 may correspond to code generator 101, policy server 602 may correspond to policy server 111, display medium 603 may correspond to display medium 106, computing device 604 may correspond to computing devices 102-104 or 107-110, and target resource 605 may correspond to target resource 112.

System 600 may operate similar to systems 300-500 as discussed above. In system 600, however, code generator 601 may be configured to generate a token (or access a remotely generated token) and encode the token together with data into the encoded visual code. With reference to FIG. 2, for example, the token and data (e.g., URL, IP address, executable file, data, contact information, password, secret, etc.) may be encoded into the visual element, such as a one-dimensional or two-dimensional bar code, binary or hexadecimal data, an image or geometric design, or other visually encoded code.

In some embodiments, the token may be a unique data element. For example, the token may be a data object that is specific to computing device 604, specific to the transmission of encoded data to computing device 604, may be a universally unique ID (UUID), may be a randomly generated value, or other types of values or data objects. Tokens may contain fields such as an owner, token identifier, group memberships, privileges, or other attributes. In other embodiments, tokens may be unique strings of digital, alphanumeric, numeric, or alphabetical characters. Code generator 601 may combine (e.g., concatenate) the data and the token before encoding them into the visual code (e.g., encode: (data+token)), may separately encode them into one or more visual codes (e.g., (encode: data)+(encode: token)), may separate them (e.g., with a spacer data element, nonce element, etc.) before encoding them (e.g., encode: (data+spacer+token)), or otherwise combine them for encoding into the visual code. In some embodiments, the token may be a single-use token or may have an expiration (e.g., time-to-live) attribute. Further, the token may be valid for a single session or single transmission in some embodiments.

In accordance with system 600, when computing device 604 receives or accesses the encoded visual code, containing the data and token, computing device 604 may scan and decode the visual code to reveal its contents, as discussed above. Once computing device 604 has accessed the token within the encoded visual code, it may determine whether the token is identical to a token previously received by computing device 604. For example, computing device 604 may store locally (e.g., cache) tokens it receives from code generator 601 or policy server 602, or may obtain tokens from a remote resource. If computing device 604 is able to successfully verify that the token in the decoded contents of the visual code is trusted (e.g., matches a cached or accessed token), computing device 604 may interact with or store the decoded data itself. As discussed above, this may involve following an IP address or URL of the data (e.g., to target resource 605), executing an executable file included in the data, storing the data in a local storage, etc. On the other hand, if the token from the decoded visual code does not match a trusted token, computing device 604 may determine to apply a control action to the data. The control action may result in the content being, for example, blocked, quarantined, deleted, included in a report or alert, identified in a report or alert, or otherwise prevented from being interacted with by computing device 604.

Figure 7:
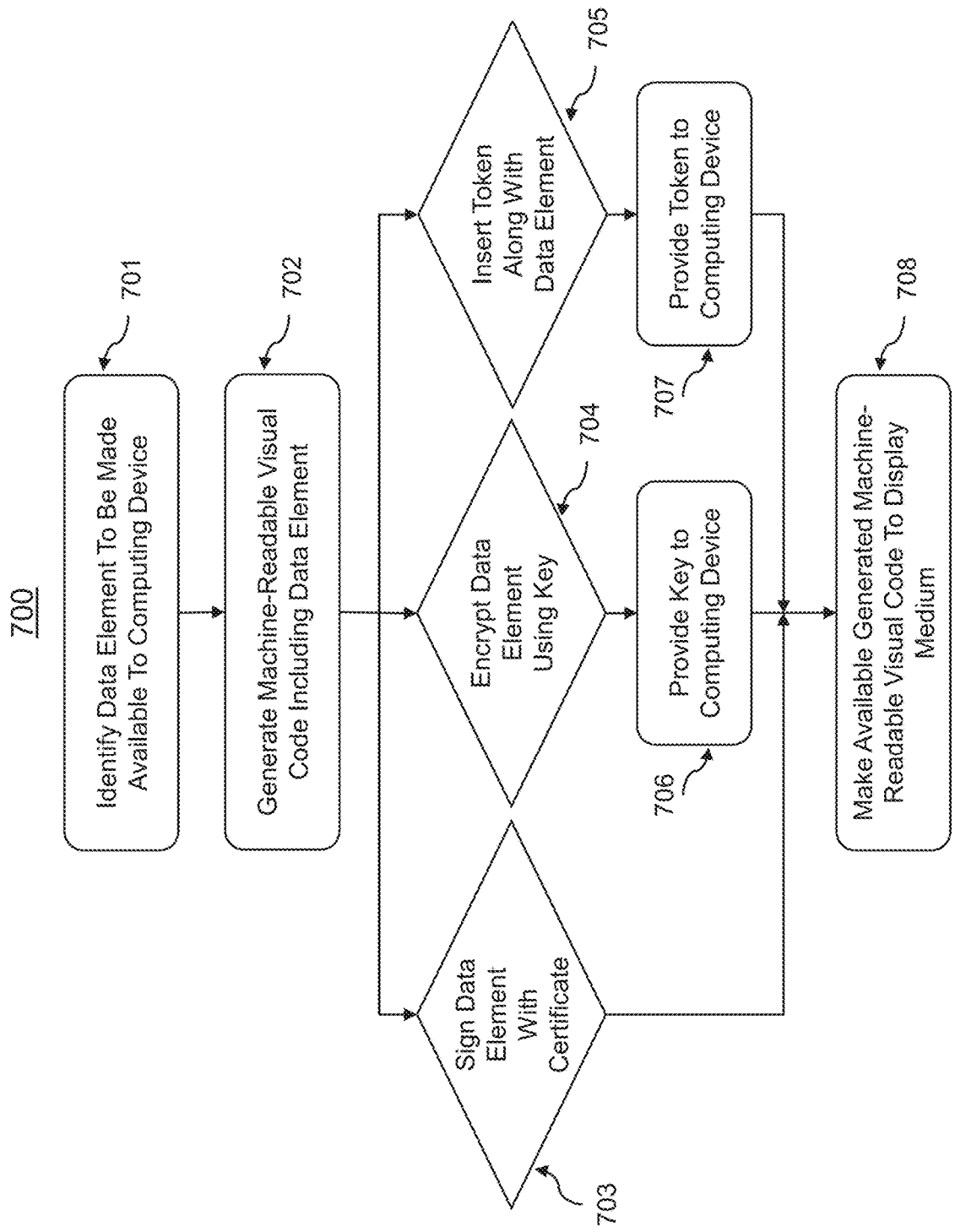
FIG. 7 is a flowchart depicting an exemplary process for securely generating verifiable machine-readable visual codes in accordance with disclosed embodiments.

FIG. 7 is a flowchart depicting an exemplary process 700 for securely generating verifiable machine-readable visual codes. Consistent with the foregoing discussion, process 700 may be based on the system environment of FIG. 1, as well as the security enhancement techniques of FIGS. 3-6. Additionally, data that is encoded in accordance with FIG. 7 may include one or more of the data types discussed in connection with FIG. 2, and may be encoded according to the encoding formats of FIG. 2.

According to process 700, operation 701 may include identifying a data element to be made available to a computing device capable of receiving and decoding machine-readable visual codes. As discussed above, the data element may take various different forms, such as a network address, IP address, MAC address, URL, resource identifier, executable code, data, configuration information, a file or document, contact information, or various other types of data. The data may be directly input to or received by a server configured to generate an encoded version of the data, or may be received from an external source (e.g., advertiser, partner, customer, etc.). In some embodiments, identifying the data element may further include identifying a particular computing device to which the encoded version of the data element should be made available (e.g., a particular computing device to receive an electronic advertisement, to display an HTML page, to display an app interface, or to scan the encoded image). As discussed above, the encoded visual code may be made available to the computing device directly (e.g., transmitted to the computing device) or indirectly (e.g., displayed on a screen or other medium proximate to the computing device).

In operation 702, process 700 may include generating a machine-readable visual code including the data element. As described above with reference to FIG. 2, machine-readable visual codes may take various forms, such as one-dimensional or two-dimensional bar codes, geometric patterns or shapes, color patterns, binary or hexadecimal data, unique encoded images, or various other types of visually encoded forms. Consistent with these encoding techniques, the data element may be encoded into the machine-readable visual code such that, when a computing device scans or reads the code, and decodes the code, the data element may be revealed as the decoded contents.

As discussed above, generating the machine-readable visual code may additionally include applying a security enhancement to the code. With reference to FIG. 3, for example, the data element may be signed using a digital certificate (e.g., received from a certificate authority) in operation 703. In that case, the computing device that later decodes the code may verify whether the digital certificate or certificate authority is included in a list of trusted sources maintained by (or accessible to) the computing device. The computing device may maintain its list of trusted certificates or certificate authorities based on such information received by the server that generates or provides the machine-readable visual codes, from the certificate authority, or from another trusted source.

Further, as discussed in connection with FIGS. 4-5, asymmetric or symmetric encryption may be applied to the data element in operation 704. In such situations, the computing device that later decodes the code may maintain a corresponding decryption key (e.g., asymmetric or symmetric) for decrypting the data element. The decryption key may be provided to the computing device in operation 706, as discussed above. Alternatively, in embodiments where the computing device itself generates the cryptographic key(s) (e.g., symmetric key, or public-private key pair), it may provide the encryption key to the server that generates the machine-readable code. The computing device may determine whether it has successfully decrypted the contents of the machine-readable visual code by determining whether a hash of the decrypted contents matches a hash it has received for the contents.

As another possible technique, a token may be encoded together with the data element into the machine-readable visual code 705. The computing device that later decodes the code may then determine whether the token matches a token received by the computing device or known to the computing device as a trusted or known token. For example, as discussed above, the token may be received by the computing device in operation 707. In alternative embodiments, the computing device itself may have generated the token, and accordingly may provide the trusted token to the server that generates the machine-readable visual code. Upon decoding the machine-readable visual code and obtaining the token, the computing device may determine whether the token (or an attribute or field of the token) matches a token (or attribute or field) stored by the computing device or accessible to the computing device.

Regardless of what security enhancement technique is applied, in some embodiments the decoding of the machine-readable code may take place in a secure or isolated (e.g., sandboxed) memory of the computing device to prevent the decrypted contents from accessing other portions of the computing device. For example, the machine-readable code may be decoded in a SecureEnclave™ environment on an Apple™ device, in a Titan M™ environment on a Google™ device, in an ARM TrustZone™ environment, or various other types of secure memory or secure processing environments. In addition, the decoded contents of the code may be analyzed in a read-only manner, such that the decoded contents are prevented from interacting with or acting upon the computing device.

In further embodiments, the computing device itself may not actually decode the machine-readable visual code. Instead, an intermediary device located functionally between the code generator and the computer device may receive the machine-readable visual code, attempt to decode it, and attempt to verify its contents. For example, the intermediary device may be a proxy server, a gateway resource protecting a network associated with the computing device, a security agent installed on the computing device, or another computing resource associated with the computing device. In such embodiments, the intermediary device may perform the techniques discussed above for attempting to verify a signature or token of the machine-readable visual code, or decrypt a portion of the machine-readable visual code. Upon a successful verification, the intermediary resource may transmit the verified contents of the machine-readable visual code (or the machine-readable visual code itself) to the computing device. In the case of an unsuccessful verification, the intermediary resource may prevent the machine-readable visual code or its contents from reaching the computing device. For example, the intermediary device may block, quarantine, trigger an alert, or delete the machine-readable visual code.

In some embodiments, a combination of two or more security enhancement techniques may be applied. For example, the data element may both be signed with a digital certificate and encrypted cryptographically. In that case, the computing device may both attempt to decrypt the data element and verify the digital certificate or certificate authority. As another example, the data element may be encoded with a token, and additionally encrypted. In that case, the computing device will attempt to decrypt the data element and additionally verify the token. Other combinations and sequences of security enhancement are possible as well.

Notably, in each scenario above, if a machine-readable visual code is generated that lacks such a security enhancement, it may be rejected or disabled by the computing device without the computing device interacting with the contents of the code. For example, if the computing device cannot verify a digital certificate or certificate authority associated with the contents, cannot decrypt the contents, or cannot verify a token associated with the contents, the computing device may take a control action to prevent interaction with or use of the code as discussed above. Thus, if the machine-readable visual code contains malicious code, a link to a dangerous website, or other unsafe content, it may be disabled with respect to the computing device. On the other hand, content that is successfully validated by the computing device may be accessed and used by the computing device (e.g., to follow a link to a URL or IP address, to download or execute a file, to download data, etc.).

In operation 708, once the machine-readable visual code has been generated, including the data element, it may be made available to the computing device for decoding and validation by the computing device. As discussed above, in some embodiments this involves directly transmitting the machine-readable visual code to the computing device. For example, the machine-readable visual code may be included in an HTML page, Java™-based page, Flash™-based page, or other web-based page retrieved by the computing device. Alternatively, the machine-readable visual code may be included in an application interface with which the computing device is interacting. In further embodiments, the machine-readable visual code may be transmitted to a separate network-accessible device and displayed proximate to the computing device. For example, the machine-readable visual code may be transmitted to a network-accessible device with a display screen, monitor, television display, projected display, or other type of display of the machine-readable visual code. In additional embodiments, the machine-readable visual code may be printed into a hard-copy form, such as a billboard, poster, card, or sign. In these various embodiments, the computing device may then attempt to scan (e.g., optically scan) or read the machine-readable visual code and decode the code to reveal its contents.

Once the computing device has decoded the machine-readable visual code, it may attempt to validate the decoded contents. As discussed above, this may occur in several ways. For example, where the decoded contents are signed with a digital certificate, the computing device may attempt to verify the certificate or certificate authority. Where the decoded contents are encrypted, the computing device may attempt to decrypt the contents and determine whether a hash of the contents matches a hash received and associated with the data element. Where the decoded contents include a token, the computing device may attempt to match the token (or a field or parameter of the token) with a known or trusted token. Of course, as discussed above, two or more of these types of security enhancement may be applied together. Additionally, as described above, the decoding of the machine-readable visual code and the attempted verification of its contents may be performed in a secure or isolated (e.g., sandboxed) memory environment of the computing device so as to avoid the decoded contents from reaching other components of the computing device. As discussed above, the computing device's ability to interact with or process the decoded data element may be conditional on whether the data element is successfully validated by the computing device.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having compute readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for securely generating verifiable machine-readable visual codes, the operations comprising:
   identifying a data element to be made available to a computing device capable of receiving and decoding machine-readable visual codes, wherein the data element is otherwise unavailable to the computing device;
   generating a machine-readable visual code including the data element;
   applying a security enhancement to the machine-readable visual code, wherein applying the security enhancement comprises selecting, from a plurality of security enhancement options, a security enhancement comprising at least one of:
      signing the data element with a certificate,
      encrypting the data element with a cryptographic key, or
      inserting a token along with the data element into the generated machine-readable visual code;

making available the generated machine-readable visual code to a display medium, such that the generated machine-readable visual code can be decoded from the display medium to yield the data element and validated by at least one of:
confirming the validity of the certificate,
decrypting the data element with a decryption key corresponding to the cryptographic key, or
confirming the validity of the token;
receiving, from the computing device, a report indicating whether the validation of the data element was successful, wherein the computing device's ability to process the data element is conditioned on the validation of the data element being successful; and
performing, based on the report indicating an unsuccessful validation, a security action associated with the data element.

2. The non-transitory computer readable medium of claim 1, wherein the computing device is configured to decode the generated machine-readable visual code in a read-only manner.

3. The non-transitory computer readable medium of claim 1, wherein the generated machine-readable visual code is at least one of: a one-dimensional bar code, a two-dimensional bar code, or a visual pattern.

4. The non-transitory computer readable medium of claim 1, wherein the computing device is configured to optically scan and decode the machine-readable visual code.

5. The non-transitory computer readable medium of claim 1, wherein the certificate has a corresponding certificate authority source, and the computing device is configured to compare the certificate authority source against a list of trusted certificate authority sources.

6. The non-transitory computer readable medium of claim 1, wherein the cryptographic key is a private key.

7. The non-transitory computer readable medium of claim 6, wherein the operations further comprise making available a public key, corresponding to the private key, to the computing device.

8. The non-transitory computer readable medium of claim 7, wherein the computing device is configured to utilize the public key to decrypt the data element.

9. The non-transitory computer readable medium of claim 8, wherein the computing device is configured to compare the decrypted data element with a hash value.

10. The non-transitory computer readable medium of claim 1, wherein the security action comprises at least one of: generating an alert associated with the data element, blocking the data element, or adding the data element to a black list.

11. A computer-implemented method for securely generating verifiable machine-readable visual codes, the method comprising:
identifying a data element to be made available to a computing device capable of receiving and decoding machine-readable visual codes, wherein the data element is otherwise unavailable to the computing device;
generating a machine-readable visual code including the data element;
applying a security enhancement to the machine-readable visual code, wherein applying the security enhancement comprises selecting, from a plurality of security enhancement options, a security enhancement comprising at least one of:
signing the data element with a certificate,
encrypting the data element with a cryptographic key, or
inserting a token along with the data element into the generated machine-readable visual code;
making available the generated machine-readable visual code to a display medium, such that the generated machine-readable visual code can be decoded from the display medium to yield the data element and validated by at least one of:
confirming the validity of the certificate,
decrypting the data element with a decryption key corresponding to the cryptographic key, or
confirming the validity of the token;
receiving, from the computing device, a report indicating whether the validation of the data element was successful, wherein the computing device's ability to process the data element is conditioned on the validation of the data element being successful; and
performing, based on the report indicating an unsuccessful validation, a security action associated with the data element.

12. The computer-implemented method of claim 11, further comprising transmitting the generated machine-readable visual code to the display medium.

13. The computer-implemented method of claim 11, further comprising transmitting the decryption key to the computing device.

14. The computer-implemented method of claim 11, further comprising transmitting the token to the computing device.

15. The computer-implemented method of claim 11, wherein the token is unique and randomly generated.

16. The computer-implemented method of claim 11, wherein the token has an expiration time attribute or time-to-live attribute.

17. The computer-implemented method of claim 11, wherein the cryptographic key is a symmetric key and the decryption key is also the symmetric key.

18. The computer-implemented method of claim 11, further comprising receiving a report that the computing device accessed a network resource corresponding to the data element.

19. The computer-implemented method of claim 11, further comprising at least one of: generating an alert associated with the data element, blocking the data element, or adding the data element to a black list.

* * * * *